(12) United States Patent
Kasravi et al.

(10) Patent No.: US 10,354,187 B2
(45) Date of Patent: Jul. 16, 2019

(54) CONFIDENTIALITY OF FILES USING FILE VECTORIZATION AND MACHINE LEARNING

(71) Applicant: HEWLETT PACKARD ENTERPRISE DEVELOPMENT LP, Houston, TX (US)

(72) Inventors: Kas Kasravi, W. Bloomfield, MI (US); James C. Cooper, Bloomington, IN (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 122 days.

(21) Appl. No.: 13/743,971

(22) Filed: Jan. 17, 2013

(65) Prior Publication Data

US 2014/0201111 A1   Jul. 17, 2014

(51) Int. Cl.
  *G06N 3/08*   (2006.01)
  *G06F 16/35*  (2019.01)
  *G06F 21/62*  (2013.01)

(52) U.S. Cl.
  CPC .......... *G06N 3/084* (2013.01); *G06F 16/35* (2019.01); *G06F 21/6245* (2013.01)

(58) Field of Classification Search
  CPC .......... G06N 99/005; G06N 3/08; G06F 7/06
  USPC ..................................................... 706/12, 20
  See application file for complete search history.

(56) References Cited

U.S. PATENT DOCUMENTS

| | | | |
|---|---|---|---|
| 6,119,112 A * | 9/2000 | Bush | G06N 3/08 706/25 |
| 6,192,360 B1 * | 2/2001 | Dumais et al. | |
| 7,529,748 B2 * | 5/2009 | Wen et al. | |
| 7,933,031 B2 | 4/2011 | Aritomi | |
| 7,961,175 B2 | 6/2011 | Lapstun et al. | |
| 8,010,466 B2 | 8/2011 | Patinkin | |
| 8,041,952 B2 | 10/2011 | Parry | |
| 8,127,149 B1 * | 2/2012 | Nachenberg | G06F 21/6218 713/193 |
| 8,245,306 B2 | 8/2012 | Gimenez | |
| 8,305,604 B2 | 11/2012 | McIntyre | |
| 8,572,758 B1 | 10/2013 | Clifford | |

(Continued)

OTHER PUBLICATIONS

Alparslan et al alia. Classification of Confidential Documents by Using Adaptive Neuro-fuzzy Interference Systems. Procedia Computer Science 3 (2011) 1412-1417.*

(Continued)

*Primary Examiner* — Alexey Shmatov
*Assistant Examiner* — Robert Bejcek, II
(74) *Attorney, Agent, or Firm* — Fabian VanCott

(57) ABSTRACT

A method for confidentiality classification of files includes vectorizing a file to reduce the file to a single structured representation; and analyzing the single structured representation with a machine learning engine that generates a confidentiality classification for the file based on previous training. A system for confidentiality classification of files includes a file vectorization engine to vectorize a file to reduce the file to a single structured representation; and a machine learning engine to receive the single structured representation of the file and generate a confidentiality classification for the file based on previous training.

17 Claims, 9 Drawing Sheets

(56) References Cited

U.S. PATENT DOCUMENTS

| | | | | |
|---|---|---|---|---|
| 8,799,287 | B1* | 8/2014 | Barile | G06F 17/30707 |
| | | | | 707/738 |
| 2002/0042884 | A1 | 4/2002 | Wu et al. | |
| 2005/0166052 | A1 | 7/2005 | Khormaei et al. | |
| 2007/0031046 | A1 | 2/2007 | Onishi | |
| 2009/0067729 | A1 | 3/2009 | Turkelson et al. | |
| 2011/0093768 | A1 | 4/2011 | Panwar | |
| 2011/0239113 | A1 | 9/2011 | Hung et al. | |
| 2012/0101870 | A1 | 4/2012 | Gates et al. | |
| 2012/0206758 | A1 | 8/2012 | Gibson et al. | |
| 2013/0007097 | A1* | 1/2013 | Sambe | G06F 3/0604 |
| | | | | 709/203 |
| 2014/0304197 | A1* | 10/2014 | Jaiswal | G06F 21/6209 |
| | | | | 706/12 |

OTHER PUBLICATIONS

Dalal et alia. Automatic Text Classification: A Technical Review. International Journal of Computer Applications, vol. 28, No. 2, Aug. 2011, 4 pages.*

Lam et alia. Feature Reduction for Neural Network Based Text Categorization. 6th International Conference on Database Systems for Advanced Applications, pp. 195-202, 1999.*

Pearson et alia. Privacy, Security and Trust Issues Arising from Cloud Computing. 2nd IEEE International Conference on Cloud Computing Technology and Science. 2010.*

Khan et alia. Mining Opinion from Text Documents: A Survey. 3rd IEEE International Conference on Digital Ecosystems and Technologies. 2009.*

Extract, Transform, Load. Wikipedia. http://en.wikipedia.org/wiki/Extract,_transform,_load. Dated May 5, 2011.*

Calrim, State of California Records Management Program, "Electronic Records Management Handbook," (Research Paper), Feb. 2002, 105 pages, available at http://www.documents.dgs.ca.gov/osp/recs/ermhbkall.pdf.

Hewlett-Packard Development Company, L.P., "Cloud printing in the enterprise: Liberating the mobile print experience from cables, operating systems and physical boundaries," Mar. 2010, <http://www.hubtechnical.com/Collateral/Documents/English-US/HP/11-CloudPrintingintheEnterprise.pdf>.

Hewlett-Packard Development Company, L.P., "HP Access Control Secure Pull Printing," Nov. 2008, <http://h71028.www7.hp.com/enterprise/downloads/HP-Access-Control-Secure-Pull-Printing.pdf>.

Hewlett-Packard Development Company, L.P., "HP ePrint Enterprise mobile printing solution," Mar. 2010, <http://www.hp.com/hpinfo/newsroom/press_kits/2010/MPSSpring2010/pdf/HP_ePrint.pdf>.

Hewlett-Packard Development Company, L.P., "HP ePrint Enterprise mobile printing solution," Sep. 2010, <http://www.hp.com/hpinfo/newsroom/press_kits/2010/InnovationSummit/HP_ePrint_Enterprise_Solution.pdf>.

Canon, "ImageWARE(TM) Secure Audit Manager," 2007, <http://www.usa.canon.com/CUSA/assets/app/pdf/ISG_Security/brochure_iwsam_.pdf>.

Lexmark, "Lexmark Secure Content Monitor," 2012, <http://lexmark.com/common/masterbrochures/Secure-Content-Monitor.pdf>.

Oxygen Cloud Storage, http://home.oxygencloud.com/features/.

ShareFile for enterprises; Product Overview; CITRIX; 2015; Citrix Systems; Inc.; 6 pages.

Oxygen Cloud Storage; Dec. 22, 2012; https://www.oxygencloud.com/ available at http://web.archive.org/web/20121222173639/https://oxygencloud.com/ from the WayBack Machine.

ShareFile for enterprises; Product Overview; CITRIX; Dec. 22, 2012; Citrix Systems; Inc.; 2 pages; https://www.citrix.com/products/sharefile/overview.html available at http://web.archive.org/web/20121231090126/http://www.citrix.com/products/sharefile/overview.html.

* cited by examiner

CONFIDENTIALITY OF FILES USING FILE VECTORIZATION AND MACHINE LEARNING

BACKGROUND

An organization may have files that it desires to protect from unauthorized use. For example, an organization's sensitive and proprietary information may include, but is not limited to, financial reports, product specifications, customer data, and confidential e-mail messages.

Data leak protection is a preventative process for securing data to avoid potential data breach incidents. An aspect of data leak protection is determining how data is to be generated, amended, enhanced, stored or transmitted to avoid potential data breach incidents. Further, determining how data is to be generated, amended, enhanced, stored or transmitted can be based on data classification. Data classification is a process of assigning a security category or level of sensitivity to data as it is being generated, amended, enhanced, stored or transmitted. An organization may have implemented a data security policy and procedures that require all files to be classified in compliance with an organization's corporate, regulatory, and statutory requirements for confidentiality. The classification of the data can then determine the extent to which the data should be processed, controlled or secured and may also be indicative of its value in terms of being a business asset.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1A:
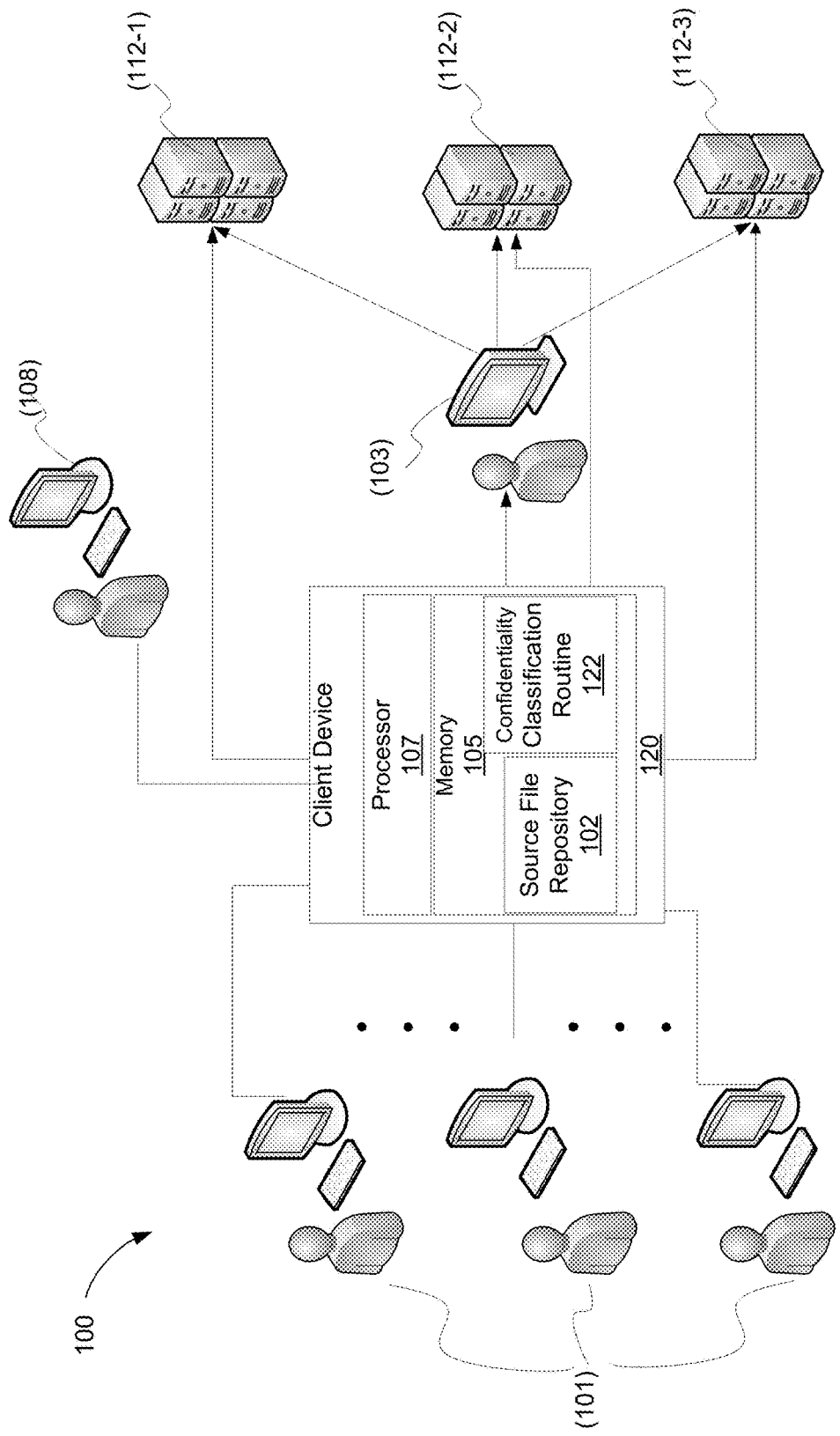
FIG. 1A is a diagram showing a system for assigning a confidentiality classification to data, according to one example of principles described herein.

As mentioned above, an aspect of data leak protection is determining how data is to be generated, amended, enhanced, stored or transmitted to avoid potential data breach incidents. Further, determining how data is to be generated, amended, enhanced, stored or transmitted can be based on data classification. Data classification is a process of assigning a security category or level of sensitivity to data as it is being generated, amended, enhanced, stored or transmitted. The classification of the data should then determine the extent to which the data should be processed, controlled or secured, stored, and may also be indicative of its value in terms of being a business asset. Further, the term file may be used to indicate a collection of any type of data needing a confidentiality classification. For example, a file may be any type of document, image, audio clip, or video clip in which the file can be classified and stored based on its degree of confidentiality.

The classification of a file as to its confidentiality can be performed manually. Manual classification generally involves a human user, perhaps a subject matter expert, examining a file to determine the degree of confidentiality of the file based on an organization's confidentiality policy. The degree of confidentiality for the classification of the file may be for example, confidential, non-confidential or some other designation. Once the degree of confidentiality of the file has been determined, the file is may be marked accordingly and manually routed to an appropriate storage location.

If the file is determined to be confidential, an appropriate storage location may be a secure server, such as a private cloud. Alternatively, if the file is determined to be non-confidential, an appropriate storage location may be an unsecured server, such as a public cloud. In addition to file sensitivity, some organizations are also mandated to store certain types of files in country or in region to be in compliance with legislated requirements. In such a case, files may be stored on a local server or otherwise within the regulatory or statutorily permitted area.

The appropriate storage location is determined by the cost for storage verses the risk if the data were made public or available to competitors. Secure storage is more expensive, but is justified by the sensitivity of the data securely stored. Storing a non-confidential document on a secured location may be an unnecessary expense.

Manual classification and routing of a file based on confidentiality is subject to inconsistencies, inaccuracies, and intentional misuse. Consequently, if a user misidentifies the appropriate classification, the file may be stored improperly. For example, access to the file may be insufficiently restriction such that a number of unauthorized users may view the contents of the file. Alternatively, a non-confidential file stored on a secure server, such as a private cloud, may incur additional expense needlessly.

Further, a file's confidentially may change over time according to an organization's confidentiality policy. For example, files associated with a new product may be confidential during the development phase. However, after the product has been introduced to the market the files associated with the new product are no longer confidential. Thus, all existing files associated with the new product that were previously classified are reviewed manually and classified again. Thus, an organization having a large number of files to classify may have difficulty meeting the time demands needed to manually classify the files. Moreover, labeling files, in the header or footer, for example, as "confidential" or "non-confidential" is not sufficient. Technical enforcement of the data usage confidentiality policy is needed to ensure that sensitive and proprietary information is not misused.

An alternate approach to manual classification of a file is a rule-based system. A rule-based system makes deductions, choices, infers information, or takes action on a file based on a given set of rules and can be automated. The set of rules may be based on the organization's confidentiality policy. Thus, a rule-based system determines the degree of confidentiality for the classification of a file based on the organization's confidentiality policy. Once the degree of confidentiality of the file has been determined by a rule-based engine, the file may be automatically routed to an appropriate storage location. As noted above, if the file is determined to be confidential, an appropriate storage location may be a secure server, such as a private cloud. Alternatively, if the file is determined to be non-confidential, an appropriate storage location may be an unsecured server, such as a public cloud.

However, using only a rule-based system for the confidentiality classification of files lacks robustness and flexibility. For example, the most basic rule-based system merely looks in a file for an explicit designation of the files confidentiality classification, such as "confidential" in the header or footer, and classifies the file accordingly. For any more complex rule-based system, the knowledge-base or rule-base on which the system operates needs to be constantly updated in a consistent and conflict-free manner. Updating a rule-based system in a consistent and conflict-free manner is a difficult task and leads to many errors for the classification of a file if done improperly. Consequently, implementations of a rule-based engine are limited to only explicit cases for file classification. Thus, if more complex files are desired to be classified, the file may not be able to be appropriately classified and stored using a rule-based engine.

The present specification discloses systems and methods for rapid confidentiality classification of files and recommendation for appropriate storage strategy that optimizes cost and placement for protection based on an organization's confidentiality policy and any laws or regulations that might apply. The systems and methods incorporate machine learning techniques to discover patterns for the classification of files based on confidentiality characteristics. Further, the machine learning techniques enforce corporate risk management or security policies in a consistent manner.

In order to discover patterns for the classification of a file based on the file's confidentiality characteristics, the file is vectorized. For example, the file is vectorized by separating the file into structured and unstructured attributes using an extract transform load (ETL) and a term extraction method respectively. The ETL method analyses the file's type, size, current location, and author among other. The term extraction method analyses the file's content, text, image, video, and audio. After structured and unstructured attributes are extracted from the file, the file is then reduced to a single structured representation. The classification of a file as to its confidentiality can then be performed by a trained neural net that uses the single structured representation. The neural net is trained, by a subject matter expert, using a set of files with known confidentiality based on an organization's current confidentiality policy. The set of files with known confidentiality may be, for example, a training set with adequate examples that reflect an organization's current confidentiality policy. Further, the neural net is retrained when new policies are enacted.

Further, the process may be augmented by a rules engine to more rapidly determine the classification of a file when explicit confidentiality characteristics are present in the file. The output of the neural net or rules engine determines the classification of the file as to its confidentiality. The output may be a flag, such as "confidential," "non-confidential," "review" or a numerical index that can be used by other applications or individuals to dynamically assign a confidentiality classification to the file.

In one example, if the output of the rules engine is a numerical index, the numerical index may range from 0 to 100, where 100 designates a file that is extremely confidential and 0 designates a file that is entirely non-confidential. In one example, if the classification of a file as to its confidentiality cannot be determined automatically, the file is flagged for review. A subject matter expert may then manually review the file in question and appropriately categorize the file.

Finally, the output leads to the appropriate storage strategy for the file, such as storing the file on a secure serve, unsecured server, or on a local server or within a specific jurisdiction. As indicated above, the appropriate storage strategy for a confidential file may include a secure server, such as a private cloud. Alternatively, the appropriate storage strategy for a non-confidential file may include an unsecured server, such as a public cloud.

As used in the present specification and in the appended claims, the term "file" refers broadly to as any type of document, image, audio clip, or video clip in which the file can be classified and stored based on its degree of confidentiality.

As used in the present specification and in the appended claims, the term "file vectorization" refers broadly to a process to reduce a file's structured and unstructured attributes into a single structured representation of the file's characteristics. The file's characteristics capture a number of elements within a file to determine a file's degree of confidentiality. Elements may include, for example, identification, file name, age of document, rank of author, presence of confidentiality mark, project name, new product name, client name, patent, and invention disclosure, among others.

As used in the present specification and in the appended claims, the term "machine learning" refers broadly to an artificial intelligence technique in which a computer's behavior evolves based on empirical data. In some cases, input empirical data may come from databases and yield patterns or predictions thought to be features of the underlying mechanism that generated the data. Further, a major focus of machine learning is the design of algorithms that recognize complex patterns and makes intelligent decisions based on input data. Machine learning may incorporate a number of methods and techniques such as; supervised learning, unsupervised learning, reinforcement learning, multivariate analysis, case-based reasoning, backpropagation, and transduction. The present specification discloses systems and methods for machine learning using supervised learning and backpropagation techniques implemented in a neural net. However, it will be apparent that the present specification is not limited to neural nets, supervised learning, and backpropagation techniques. Rather, a number of other machine learning techniques may be implemented.

As used in the present specification and in the appended claims, the term "backpropagation" refers broadly to a common method of training artificial neural nets so as to minimize an objective function. Further, backpropagation is a supervised learning method and is a generalization of the delta rule. The delta rule is a gradient descent learning rule for updating the weights of the artificial neurons contained within the neural net. Additionally, the delta rule uses a dataset of the desired output for many inputs, making up the training set.

As used in the present specification and in the appended claims, the term "supervised learning" refers broadly to a machine learning task of inferring a function from a labeled training set. The training set consists of a number of training examples. In supervised learning, each example in the training set consists of an input object such as a vector and a desired output value. A supervised learning algorithm analyzes the training set and produces an inferred function, or classifier if the output is discrete, or a regression function if the output is continuous. The inferred function predicts the correct output value for any valid input object such as a file vector.

In the following description, for purposes of explanation, numerous specific details are set forth in order to provide a thorough understanding of the present systems and methods. It will be apparent the systems and methods may be practiced without these specific details. Reference in the specification to "an example" or similar language means that a particular feature, structure, or characteristic described in connection with that example is included as described, but may not be included in other examples.

Further, as used in the present specification and in the appended claims, the term "a number of" or similar language is meant to be understood broadly as any positive number comprising 1 to infinity; zero not being a number, but the absence of a number.

As will be described in detail below, an illustrative method for the confidentiality classification of files includes vectorizing a file to reduce the file to a single structured representation; and analyzing the single structured representation with a machine learning engine that generates a confidentiality classification for the file based on previous training. An illustrative system for the confidentiality classification of files includes a file vectorization engine to vectorize a file to reduce the file to a single structured representation; and a machine learning engine to receive the single structured representation of the file and generate a confidentiality classification for the file based on previous training.

Now, referring to the figures. FIG. 1A is a diagram showing a system for assigning a confidentiality classification to data, according to one example of principles described herein. As indicated above, a system (100) and methods are used for rapid confidentiality classification of files and recommendation for appropriate storage strategy that optimizes cost and placement for protection based on an organization's confidentiality policy and any laws or regulations that might apply. According to certain illustrative principles, the system (100) for assigning a confidentiality classification to files may have a client/server relationship as illustrated in FIG. 1A. For example, a client device (120), having a confidentiality classification routine (122), is used for assigning a degree of confidentiality classification to files. A server (112-1, 112-2, 112-3) or system of servers, collectively designated herein as 112, is then used for storing the files using an appropriate storage strategy that corresponds to the assigned confidentiality classification. Further, a human user, perhaps a subject matter expert (108), may update the client device's (120) confidentiality classification routine (122) to comply with an organizations confidentiality policy.

In one example, a user (101) in an organization may desire to store a file according to an organization's confidentiality policy. According to certain illustrative principles, the user (101) submits a file to a client device (120). The file is stored temporarily in memory (105) on the client device (120) in a source file repository (102). The source file repository (102) may consist of any repository of files, such as a folder on a server, a file stored on a cloud, or a file stored on a SHAREPOINT® web application framework and associated site developed and distributed by Microsoft Corporation, among others. The file remains stored in memory (105) until a confidentiality classification routine (122) analyses the file. The confidentiality classification routine (122) analyses the file stored in the source file repository (102) and determines the file's degree of confidentiality according to an organization's confidentiality policy.

In one example, the degree of confidentiality for a file may be "confidential," "non-confidential," "review" or a numerical "index" that can be used by other applications or individuals to dynamically assign a confidentiality classification to the file. The confidentiality classification routine (122) and method for determining the degree of confidentiality of a file is described in connection with FIG. 1C and in later sections of this specification.

In one example, if the degree of confidentiality is a numerical index, the numerical index may range from 0 to 100, where 100 designates a file that is extremely confidential and 0 designates a file that is entirely non-confidential. In another example, if the classification of a file as to its confidentiality cannot be determined automatically, the file is flagged for review. A subject matter expert may then manually review the file in question and appropriately categorize the file as confidential or non-confidential.

Further, depending on the degree of confidentiality of each file, the file is routed to an appropriate storage location (112) as described below. An appropriate storage location may include a secure sever, such as a private cloud (112-1) or an unsecured server, such as a public cloud (112-2). In addition to file sensitivity, some organizations are also mandated to store certain types of files in country or in region to be in compliance with legislated requirements. In such a case, files may be stored on a local server (112-3) or otherwise within the regulatory or statutorily permitted area.

In one example, if a file is determined to be confidential by the confidentiality classification routine (122), an appropriate storage location for the file may be a secure server, such as a private cloud (112-1). Alternatively, if a file is determined to be non-confidential by the confidentiality classification routine (122), an appropriate storage location for the file may be an unsecured server, such as a public cloud (112-2).

As mentioned above, the appropriate storage location (112) is determined by the cost for storage verses the risk if the data were made public or available to competitors. Secure storage on a private cloud (112-1) is more expensive, but is justified by the sensitivity of the data securely stored. Storing a non-confidential document on a secured location, such as a private cloud (112-1) may be an unnecessary expense.

Thus, a user (101) may submit a file to a client device (120). A confidentiality classification routine (122) located on the client device (120) determines the degree of confidentiality for each file according to an organization's confidentiality policy. Finally, the file is then stored using an appropriate storage strategy according to the organization's confidentiality policy.

Figure 1B:
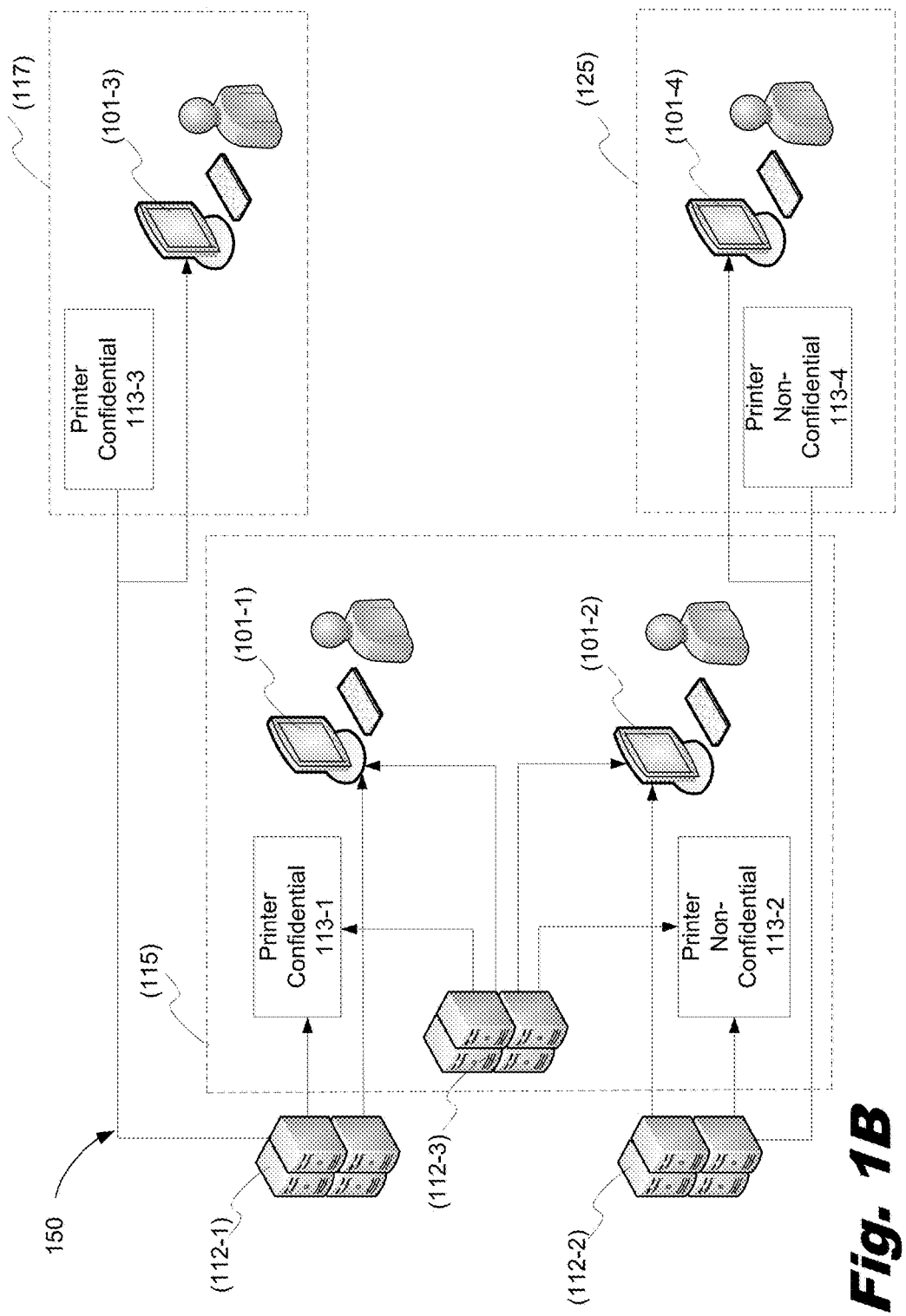
FIG. 1B is a diagram showing a system for retrieving the confidentiality classification of stored files, according to one example of principles described herein.

FIG. 1B is a diagram showing an illustrative system for retrieving the files that have been stored based on confidentiality classification. In a various examples, a user may desire to retrieve a file from a secure server, such as a private cloud (112-1), an unsecured server, such as a public cloud (112-2), or a local server (112-3). According to certain illustrative principles, a file may be accessed or printed from a secure server, such as a private cloud (112-1), an unsecured server, such as a public cloud (112-2), or a local server (112-3). Further, a file may be accessed or printed with only certain printers, from certain locations, and by certain users as determined by an organization's confidentiality policy.

In one example, users A and C (101-1,101-3, respectively) may access only confidential files stored on a secure server, such as a private cloud (112-1). In another example, users B and D (101-2, 101-4, respectively) may access only non-confidential files stored on an unsecured server, such as a public cloud (112-2). As mentioned above, some organizations are also mandated to store certain types of files in country or in region to be in compliance with legislated requirements. In such a case, files may be retrieved or accessed only from a local server (112-3) or otherwise within the regulatory or statutorily permitted area by users A and B (101-1,101-2, respectively).

In keeping with the given example, user A (101-1) may retrieve or print a confidential file stored on a secure server, such as a private cloud (112-1) or on a local server (112-3) only with a confidential printer (113-1) located inside (115) the organization. Alternatively, in another example, there may be some other location (117) where a user (101-3) may retrieve or print a confidential file using a confidential printer (113-3).

In keeping with the given example, user B (101-2) may retrieve or print a non-confidential file stored on an unsecured server, such as a public cloud (112-2) or a local server (112-3) with a non-confidential printer (113-2) located inside (115) the organization. Alternatively, because the file is non-confidential, user D (101-4) may be allowed to retrieve or print the non-confidential file with a non-confidential printer (113-4) located outside (125) of the organization.

Thus, some files may only be accessed from certain locations (115, 117, 125), by certain users (101). Additionally, some files can be printed only with certain printers (113) according to an organization's confidentiality policy.

Figure 1C:
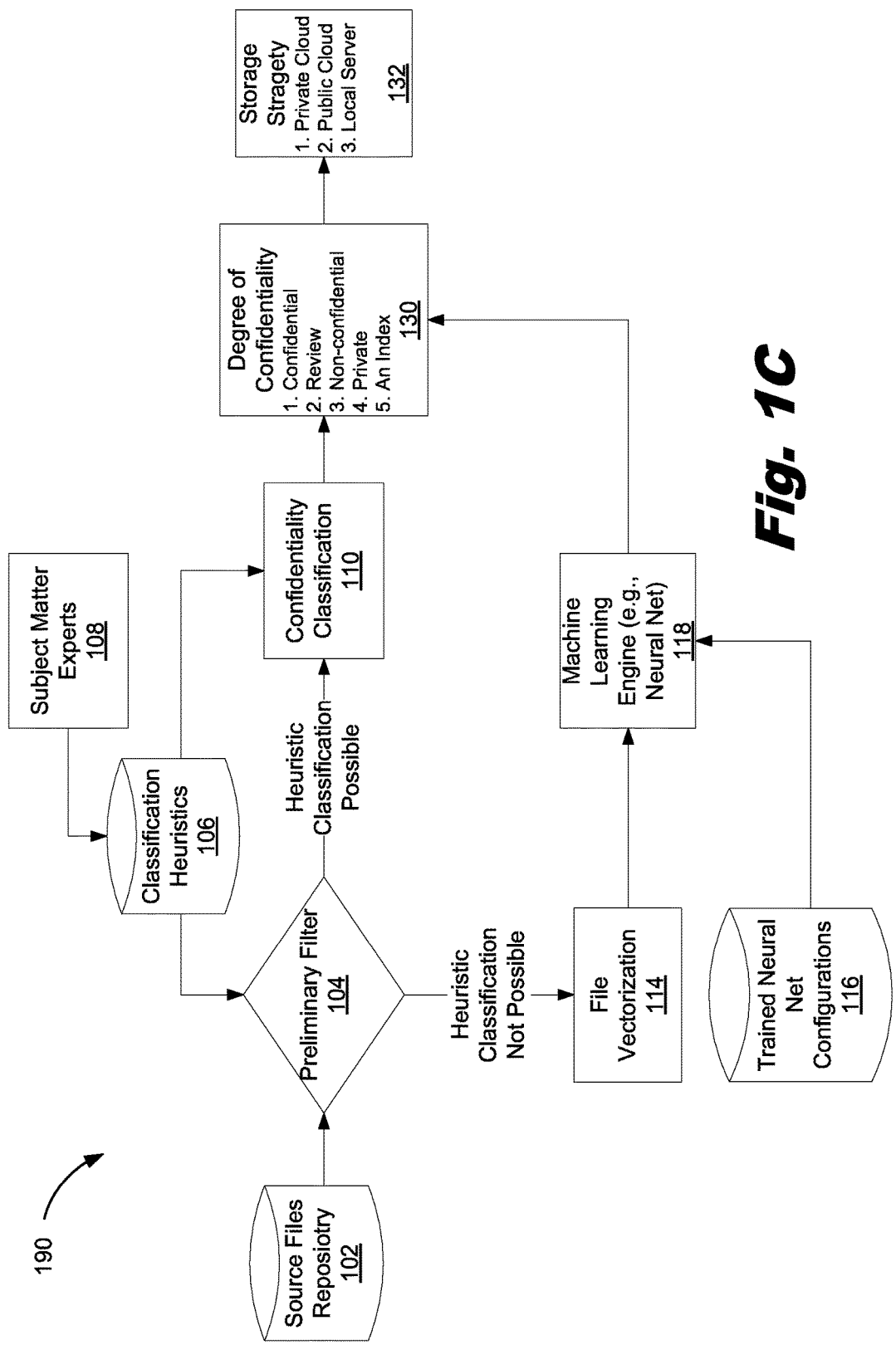
FIG. 1C is a diagram showing a method for the confidentiality classification and storage of files, according to one example of principles described herein.

FIG. 1C is a diagram showing a method for the confidentiality classification and storage of files, according to one example of principles described herein. The elements of FIG. 1C provide an overall listing of principles disclosed herein. The overall listing of elements provides a framework for a method of confidentiality classification and storage of files. Each element of FIG. 1C is described in detail in later sections of this specification.

As described in FIG. 1A, a number of files needing classification, such as, documents, images, audio clips, or video clips are sent to a source file repository (102) to temporarily store such files. As mentioned above, the source file repository (102) may consist of any repository of files, such as a folder on a server, a file stored on a cloud, or a file stored on a SHAREPOINT® web application framework and associated site developed and distributed by Microsoft Corporation, among others.

Next, a file needing confidentiality classification is taken out of the source file repository (102) and is sent to a preliminary filter (104). The preliminary filter (104) identifies any file that has explicit indications of confidentiality. Explicit indications of confidentiality may include, but are not limited to, the occurrence of the word "confidential" located in the header, footer or elsewhere in the document. In the case of legislated requirements of storage placement, attributes of the owner can be determined such as geographical location as an explicit indication direct a subsequent storage strategy.

If the preliminary filter (104) determines the file has explicit indications of confidentiality, the file is sent to a confidentiality classification engine (110). Alternatively, if the preliminary filter (104) determines the file has no explicit indications of confidentiality, the file is sent to a file vectorization engine (114) process.

Assume the preliminary filter (104) determines a file has explicit indications of confidentiality. Thus, the file is sent to a confidentiality classification engine (110). The confidentiality classification engine (110) is used to more rapidly determine the classification of a file when explicit confidentiality characteristics are present in the file. As mentioned above, a rule-based system makes deductions, choices, infers information, or takes action on a file based on a given set of rules and is automated. The set of rules is based on an organization's confidentiality policy. The output of the confidentiality classification engine (110) determines the degree of confidentiality (130) of the file based on the organization's confidentiality policy.

Once the degree of confidentiality (130) of a file has been determined by the confidentiality classification engine (110), the file may be automatically routed to an appropriate storage location (132). As noted in FIG. 1A, a file's appropriate storage strategy (132) is based on the files confidentiality classification and the organization's confidentiality policy.

Figure 2:
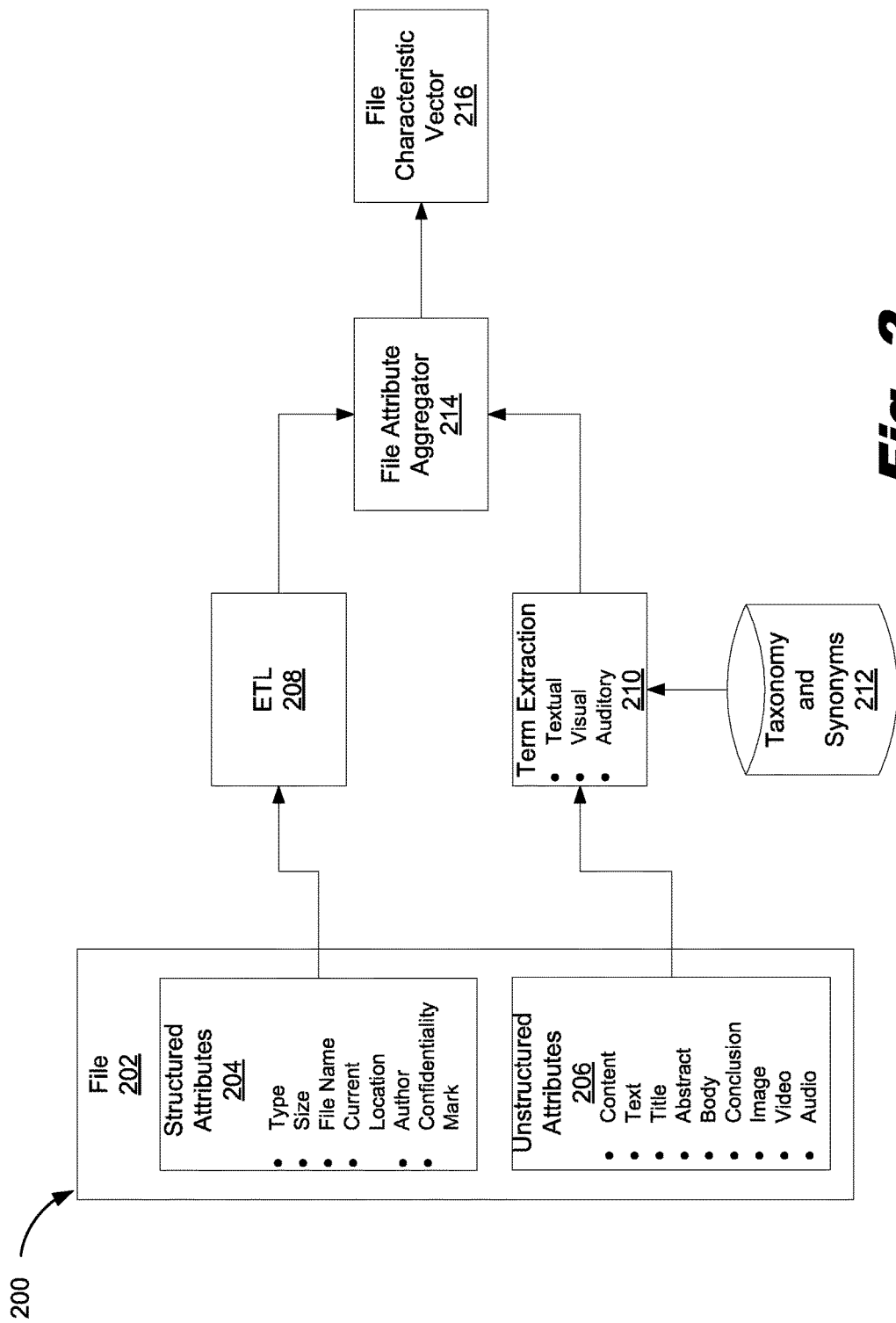
FIG. 2 is a diagram illustrating a file vectorization process, according to one example of principles described herein.

In one example, if a file's degree of confidentiality (130) is "confidential", the confidential file is stored on a secure server, such as a private cloud (FIG. 1A, 112-1). In another example, if a file's degree of confidentiality (130) is "non-confidential," the non-confidential file is stored on an unsecured server, such as a public cloud (FIG. 1A, 112-2). In any case, if the classification of a file as to its confidentiality cannot be determined automatically, the file's degree of confidentiality (130) is flagged for "review". A subject matter expert may then manually review the file in question and appropriately categorize the file. Once the file is appropriately categorized, the file is then routed according to the appropriate storage strategy (132).

Additionally, both the preliminary filter (104) and the confidentiality classification (110) draw their rules from a common classification heuristics knowledge-base (106). The classification heuristics knowledge-base (106) is manually maintained by a number of subject matter experts (108) familiar with the organization's confidentiality policies. Thus, by using a preliminary filter (104) and a corresponding confidentiality classification (110), a number of files having explicit indications for confidentiality classification may be easily classified and stored in a rapid manner.

Alternatively, a number of files stored in the source file repository (102) may not have explicit indications of confidentiality. If the preliminary filter (104) determines a file does not have explicit indications of confidentiality, as indicated above, the file is sent to a file vectorization engine (114) process for further evaluation of confidentiality. As indicated above, the file vectorization engine (114) process reduces a file to a single structured representation. The single structured representation describes the file's characteristics. Further, the file vectorization engine (114) process can be done using the method (200) detailed in FIG. 2 and corresponding text provided in a later section of this specification.

Next, the single structured representation of the file is sent to a machine learning engine (118), which may, for example, include a neural net. The machine learning engine (118) processes the single structured representation and reports the degree of confidentiality (130) of the file. The machine learning engine (118) is described in detail in FIG. 3 and corresponding text provided in a later section of this specification. Further, a number of variations of a neural net to be used as the machine learning engine (118) are described in detail in FIGS. 5, 6, and 7 and corresponding text provided in a later section of this specification.

Additionally, the neural net (118) receives operational characteristics from a trained neural net configuration (116). This process can be done using the method detailed in FIG. 4 and corresponding text provided in a later section of this specification. As mentioned above, this specification uses neural nets, supervised learning, and backpropagation techniques to rapidly determine a file's degree of confidentiality. However, it should be noted other machine learning techniques may be used such as regression, case based reasoning, reinforcement learning among others to determine a file's degree of confidentiality and an appropriate storage strategy for that file.

FIG. 2 is a diagram illustrating a file vectorization process (200), according to one example of principles described herein. As mentioned in FIG. 1C, if heuristic classification of a file is not possible using a preliminary filter (FIG. 1C, 104), the file is sent to a file vectorization (FIG. 1C, 114) process. As noted above, in order to discover patterns for the classification of a file based on the file's confidentiality characteristics, the file is vectorized. For example, the file is vectorized by separating the file into structured and unstructured attributes. After structured and unstructured attributes are extracted from the file, the file is then reduced to a single structured representation. The single structured representation of a file is used for subsequent analysis by a neural net. This process is described below.

According to certain illustrative principles, a file (202) may consist of a number of structured attributes (204) and unstructured attributes (206). In one example, structured attributes (204) in a file (202) consist of, but are not limited to, type, size, file name, current location, author, confidentiality mark, among others. Alternatively, unstructured attributes (206) in a file (202) consist of, but are not limited to, content, image, video, audio, and text, including title, abstract, body, and conclusion.

According to certain illustrative properties, a file (202) consisting in part or entirely of structured attributes (204) is processed using an Extract Transform Load (ETL) (208) method. An ETL (208) extracts data from a file (202), transforms the data according to a set of rules, and loads the transformed data into an end target. In one example, the ETL (208) extracts a number of structured attributes (204) from a file (202). Once the structured attributes (204) have been extracted they are transformed to fit operational needs such as transforming the structured attributes (204) according to certain rules or principles. Further, the extracted and transformed structured attributes (204) are loaded into the end target, for example, a file attribute aggregator (214). The file attribute aggregator (214) combines structured attributes (204) and unstructured attributes (206) as described below.

In one example, an ETL method may be executed using commercially available tools such as TextAnalyst™ or WordFast®. In another example, the ETL method may be based on techniques such as term frequency-inverse document frequency (tf-idf). A tf-idf is a numerical statistic that reflects the relevance of a word in a file given a large and structured set of text. Tf-idf is often used as a weighting factor for retrieving information. Further, the tf-idf value increases proportionally to the number of times a word appears in the file. However, the tf-idf's value is offset by the frequency of the word in the large and structured set of text to help to control the fact that some words are generally more common than others. These methods and techniques may be utilized to perform an ETL on the structured attributes (204) of a file (202). Further, a number of techniques and methods described above may be based the Helmholtz Principle. In one example, the Helmholtz Principle uses visual analysis and human perception to determine meaningful features and interesting events that appear as large deviations from randomness.

Alternatively, a file (202) consisting in part or entirely of unstructured attributes (206) is processed by a term extraction (210) process. The term extraction (210) step uses a taxonomy synonyms database (212) to extract unstructured attributes (206) from a file (202). The taxonomy and synonyms database (212) contains a number of terms that are used in identifying a number of confidentiality characteristics in a file (202). The extracted terms from a file (202) are compared against the taxonomy and synonyms database (212).

In one example, if a term in the taxonomy and synonyms database (212) has a corresponding term in a file (202), a Boolean value of true is returned for that term. Alternatively, if a term in the taxonomy and synonyms database (212) does not have a corresponding term in a file (202), a Boolean value of false is returned for that term. Consequently, a term extraction (210) method using a taxonomy and synonyms database (212) is used to extract only relevant terms that may indicate confidentiality characteristics for a number of unstructured attributes (206) in the file (202).

Assume the term extraction (210) is extracting unstructured attributes (206) from a file (202) such as an image. According to certain illustrative principles, an image may consist of picture, text, colors, shapes among others. In keeping with the given example, the image is run through both an optical character recognition (OCR) engine and a physical feature analyzer. Textual information from the file (202) is then run through a computational process that selects relevant features of the text. The physical data extracted from the file's (202) image are analyzed for several physical features helpful to document classification, such as, but not limited to, size, colorfulness, and margin smoothness. The physical feature analysis results are joined with the results of the lexical feature selection in a single structured representation for further analysis by a neural net as described in detail in FIG. 3 and in later sections of this specification.

In another example, text mining may be used to extract text from a file's (202) unstructured attributes (206). Text mining is used to derive high quality information from text. In one example, text mining uses patterns and trends from structured data to process and interpret the text into high quality information. Thus, text mining may extract relevant text from a file (202) by parsing text, finding patterns, categorize text, and cluster text among others. Thus, a number of methods may be used to extract terms from a file's (202) unstructured attributes (206).

Next, the file attribute aggregator (214) combines the output of the ETL (208) and the term extraction (210) methods. Finally, the output of the file attribute aggregator (214) is reduced to a single structured representation by a file characteristic vector (216) for subsequent analysis. As noted in FIG. 1C the file's single structured representation is analyzed, for example, by a neural net (FIG. 1C, 118). A neural net is described in further detail in FIG. 3 and corresponding text provided in a later section of this specification.

Additionally, a number of file characteristic vectors (216) may be unique in nature, but share common linear and/or non-linear patterns based on the overall characteristics of the files. Thus, a neural net (FIG. 1C, 118) is used to generalize from a training set of vector examples to rapidly determine a file's degree of confidentiality according to an organization's confidentiality policy.

Figure 3:
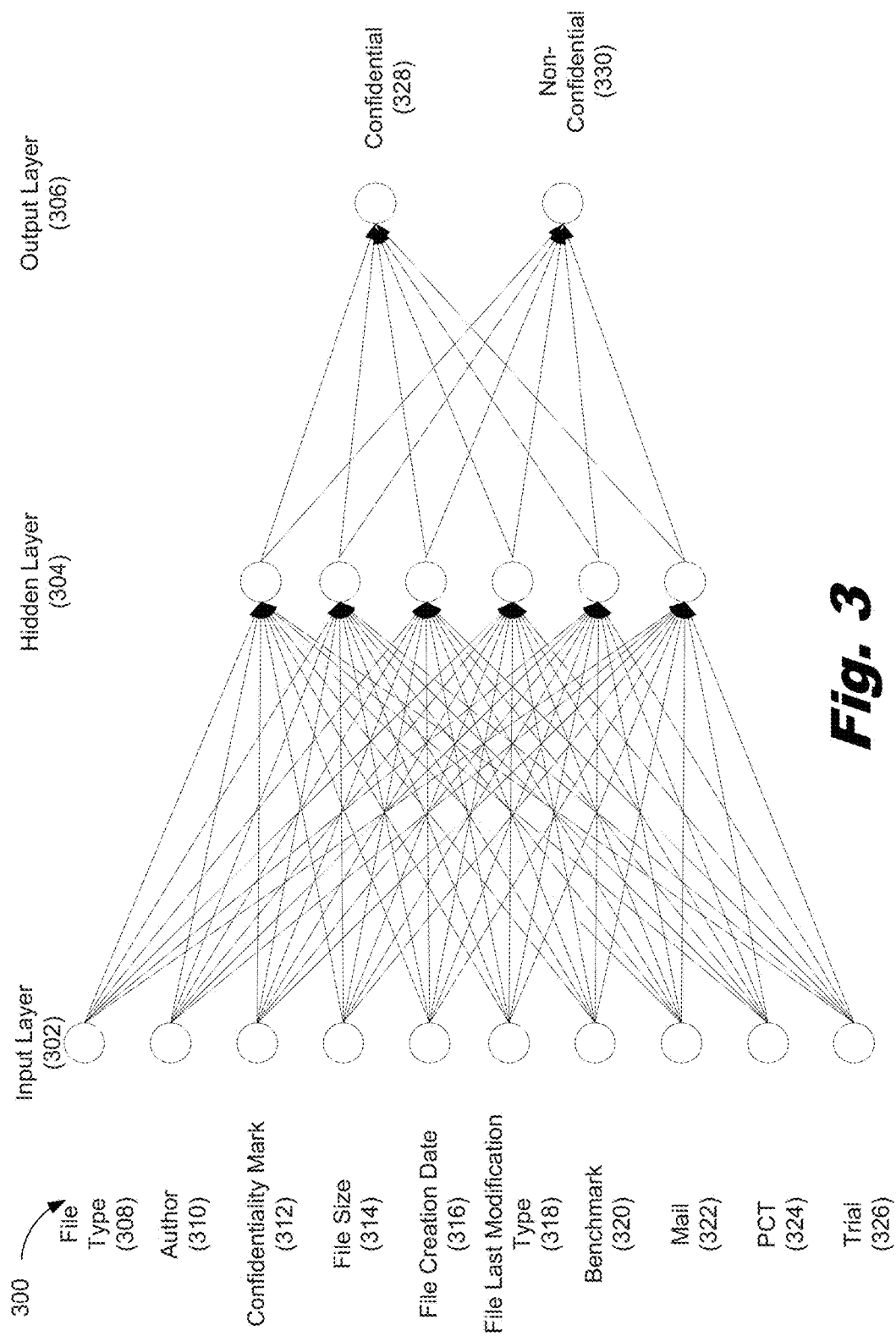
FIG. 3 is a diagram showing a neural net for backpropagation supervised learning, according to one example of principles described herein.

FIG. 3 is a diagram showing a neural net for backpropagation supervised learning, according to one example of principles described herein. As mentioned above, after structured (FIG. 2, 204) attributes and unstructured (FIG. 2, 206) attributes are extracted (FIG. 2, 208, 210) from a file (FIG. 2, 202), the file (FIG. 2, 202) is then reduced to a single structured representation (FIG. 2, 216). Using the single structured representation (FIG. 2, 216), a neural net (300) may be trained to determine the degree of confidentiality for each file. Further, the neural net (300) is trained using examples and is retrained when new policies are enacted. Examples may include an organization's confidentiality policy. The neural net (300) may generalize from given examples and discover patterns within files to produce the desired degree of confidentiality (FIG. 1 C, 130) for a file according to an organization's confidentially policy. The process for training a neural net (300) to determine a file's degree of confidentiality (FIG. 1 C, 130) using supervised learning and backpropagation is further detailed in FIG. 4 and corresponding text provided in a later section of this specification.

As mentioned in connection with FIG. 1C, neural nets using supervised learning and backpropagation are used for rapidly and efficiently determining the desired degree of confidentiality (FIG. 1C, 130) after a file has been vectorized (FIG. 1C, 114). Further, the present specification is not limited to supervised learning and backpropagation. Rather, a number of methods and techniques for machine learning may be used to produce a classification for the confidentiality (FIG. 1C, 130) of files.

In one example of FIG. 3, a neural net (300) is used for rapid confidentially classification of files. The neural net (300) uses one input layer (302), one hidden layer (304), and one output layer (306). According to certain illustrative principles, the input layer (302) of the neural net (300) matches the file vector as described in connection with FIG. 2. Therefore, there is one input neuron (308 to 326) for each attribute in the file vector. In one example, an input layer (302) may include, but is not limited to, file type (308), author (310), confidentiality mark (312), file size (314), file creation date (316), file last modification type (318), benchmark (320), mail (322), Patent Cooperation Treaty (PCT) (324), and trial (326).

In general, in order for the hidden layer (304) to serve any useful function, neural nets have non-linear activation functions for the multiple layers (302 to 306) in a neural net (300). In one example, a common non-linear activation function used in a neural net (300) is a sigmoid function. A sigmoid function is a mathematical function having an "S" shape whose function is commonly defined as $1/(1+e^{e^{-t}})$. In other examples, non-linear activation functions may include but are not limited to the logistic function, the softmax function, and the Gaussian function. A number of these techniques may be utilized to perform backpropagation.

The output layer (306) of the neural net (300) represents a file's degree of confidentially. In keeping with the example give above, two output nodes in the output layer (306) represent the degree of confidentiality for a file, such as "confidential" (328) and "non-confidential" (330).

In one example, assume a neural net (300) determines from a file's vectors (308-326), the degree of confidentiality for a file is "confidential" (328). Thus, the confidential file is stored on a secure server, such as a private cloud (FIG. 1A, 112-1) as described in connection with FIG. 1A. In another example, assume the neural net (300) determines from the file's vectors (308-326), the degree of confidentiality for a file is "non-confidential" (330). The non-confidential file is stored on an unsecured server, such as a public cloud (FIG. 1A, 112-2) as described in connection with FIG. 1A.

In addition to file confidentiality, some organizations are also mandated to store certain types of files in country or in region to be in compliance with legislated requirements. In such a case, files may be stored on a local server (FIG. 1A, 112-3) or otherwise within the regulatory or statutorily permitted area.

Figure 4:
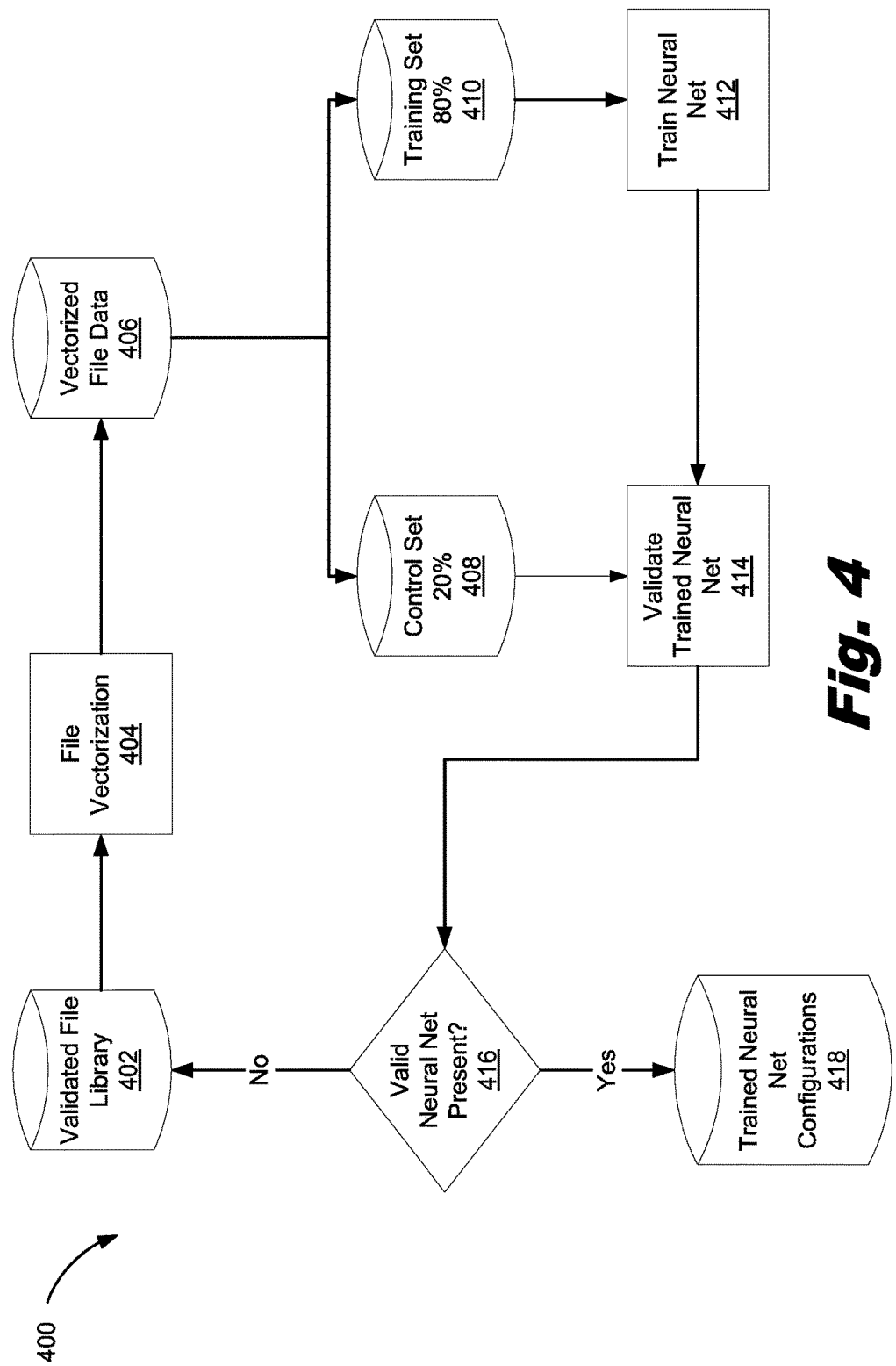
FIG. 4 is a diagram showing an illustrative method for training a neural net, according to one example of principles described herein.

FIG. 4 is a diagram showing an illustrative method for a training process (400), according to one example of principles described herein. As mentioned above, training a neural net (FIG. 3, 300) is considered to be essential if a proper degree of confidentiality of files is to be realized. In one example, if the training of a neural net (FIG. 3, 300) is done correctly, it allows rapid updates to the application logic based on empirical data.

As mentioned above, machine learning focuses on classification, based on known properties learned from a training set. One fundamental difficulty is that the training set of all possible behaviors given all possible inputs is too large to be included in the training set of observed examples. The core objective of a neural net (FIG. 3, 300) is to generalize from its experience. Hence the neural net (FIG. 3, 300) generalizes from the given examples in order to produce a useful degree of confidentiality in new cases. Further, generalization in the context of this specification is the ability of an algorithm to perform accurately on new, unseen examples after having trained on a learning training set. The training examples come from some generally unknown probability distribution. The neural net (FIG. 3, 300) has to extract something more general about the distribution that allows the neural net (FIG. 3, 300) to produce useful predictions in new cases.

One method for training a neural net (FIG. 3, 300) includes an optional validated file library (402). The validated file library (402) includes a representative set of files with a predetermined degree of confidentiality that complies with an organization's confidentiality policy. As mentioned in FIG. 1C, subject matter experts may predetermine the degree of confidentiality of each file. Each file in the validated file library (402) is processed by a file vectorization (404) step. The method for file vectorization (404) uses an ETL and term extraction techniques to reduce a file's structured and unstructured attributes into a single structured representation as described in connection with FIG. 2.

The output of the file vectorization (404) is then stored as vectorized file data (406) in a database. Thus, the vectorized file data (406) is a single structured representation of the validated file library (402).

In another method for training a neural net (FIG. 3, 300), the method does not include a validated file library (402). Rather, files are already in the form of a single structured representation and stored as vectorized file data (406). In either method, the vectorized file data (406) is used to train a neural net (FIG. 3, 300) as described below.

Next, consistent with backpropagation techniques, a percentage of the records in the vectorized file data (406) are randomly selected and set aside to serve as a control set (408). In one example, 20 percent of the records in the vectorized file data (406) are randomly selected and set aside to serve as a control set (408). In another example, 25 percent of records in the vectorized file data (406) are randomly selected and set aside to serve as a control set (408). In keeping with the given example, with 25 percent of records used as a control set, a neural net's (FIG. 3, 300) accuracy in determining if a file is confidential is 96.90 percent accurate. Further, the neural net's (FIG. 3, 300) accuracy in determining if a file is not confidential is 93.20 percent accurate.

The remaining records are used as the training set (410). A backpropagation algorithm is used in the neural net training (412) process. The neural net training (412) process determines the connection weights in the neural net (FIG. 3, 300) using supervised learning and backpropagation as described below.

According to certain illustrative examples, a neural net (FIG. 3, 300) using backpropagation and supervised learning uses a training set of the desired output for many inputs, making up the training set as mentioned in FIG. 1C.

Further, backpropagation may be divided into two phases, propagation and weight update. During each propagation, the following steps are involved. First, forward propagation of a training pattern's input through the neural net (FIG. 3, 300) in order to generate the propagation's output activations. Second, backward propagation of the propagation's output activations through the neural net (FIG. 3, 300) using the training pattern's target in order to generate the deltas of all outputs in the output layer (FIG. 3, 306) and hidden neurons in the hidden layer (FIG. 3, 304).

According to certain illustrative principles, for each weight update in the neural net (FIG. 3, 300), two steps are taken to ensure proper training of the neural net (FIG. 3, 300). First, multiply the output delta and input activation to get the gradient of the weight. Second, bring the weight in the opposite direction of the gradient by subtracting a ratio of it from the weight. Additionally, the ratio influences the speed and quality of learning or is commonly referred to as the learning rate. The sign of the gradient of a weight indicates where the error is increasing. Thus, the weight is updated in the opposite direction. Both steps are repeated a number of times until the performance of the neural net is satisfactory.

In one example, referred to as on-line or incremental learning, a weight update occurs immediately after each propagation. In another technique, referred to as batch learning, many propagations occur before a weight update occurs. Consequently, batch learning uses more memory capacity, but on-line learning uses more updates.

As mentioned above, in backpropagation, the error propagates backwards from the output nodes in the output layer (FIG. 3, 306) to the inner nodes, such as a hidden layer (FIG. 3, 304) and calculates the gradient of the error of the neural net (FIG. 3, 300) regarding the neural net's (FIG. 3, 300) modifiable weights. In one example, the gradient is used in a simple stochastic gradient descent algorithm to find weights that minimize the error. Alternatively, backpropagation may be used in a more general sense, to refer to the entire procedure encompassing both the calculation of the gradient and its use in stochastic gradient descent.

Next, the validate trained neural net (414) step is compared against a control set (408) to determine if a valid neural net (416) is present. If the trained neural net fails, the process, as described above, is repeated. Alternatively, if the trained neural net passes, the neural net configuration, such as connection weights and the number of neurons in the hidden layer (FIG. 3, 304) is stored in the trained neural net configurations database (418). Additionally, a number of trained neural net configurations database (418) may be trained for different applications to comply with an organization's confidentiality policy for appropriate storage strategy.

In one example, a neural net (FIG. 3, 300) may be trained, using the process above, to recognize the word "Condor" in a file. Assume the word "Condor" is used in a recent confidential file. The neural net (FIG. 3, 300) may be trained to determine the degree of confidentiality for any recent file with the word "Condor" as "confidential" (FIG. 3, 328) and store the file on a secure server, such as a private cloud (FIG. 1A, 112-1).

Alternatively, a file created a number of years ago containing the word "Condor" may be non-confidential. A neural net (FIG. 3, 300) may be trained to determine the degree of confidentiality for any older file with the word "Condor" as "non-confidential" (FIG. 3, 330) and store the file on an unsecured server, such as a public cloud (FIG. 1A, 112-2). Thus, a neural net (FIG. 3, 300) is trained to recognize the word "Condor" and the date of file creation to comply with an organization's confidentiality policy for appropriate storage strategy.

In another example, assume a new product is in the developmental phase. Assume the new product uses the code name "Envy" in any file associated with the new product. Further assume, according to an organization's confidentiality policy, any file associated with the new product during the developmental phase is confidential. Thus, a neural net (FIG. 3, 300) may be trained to determine the degree of confidentiality for any file with the word "Envy" as "confidential" (FIG. 3, 328) and store the file on a secure server, such as a private cloud (FIG. 1A, 112-1). As mentioned above, a file's confidentially may change over time according to an organization's confidentiality policy. Assume, after the product has been introduced to the market the files associated with the new product are no longer confidential. Further assume, all existing files associated with the new product using the code name "Envy" that were previously classified as confidential are no longer confidential. Thus, a neural net (FIG. 3, 300) may be retrained to determine the degree of confidentiality for any file with the word "Envy" as "non-confidential" (FIG. 3, 330) and store the file on an unsecured server, such as a public cloud (FIG. 1A, 112-2).

Figure 5:
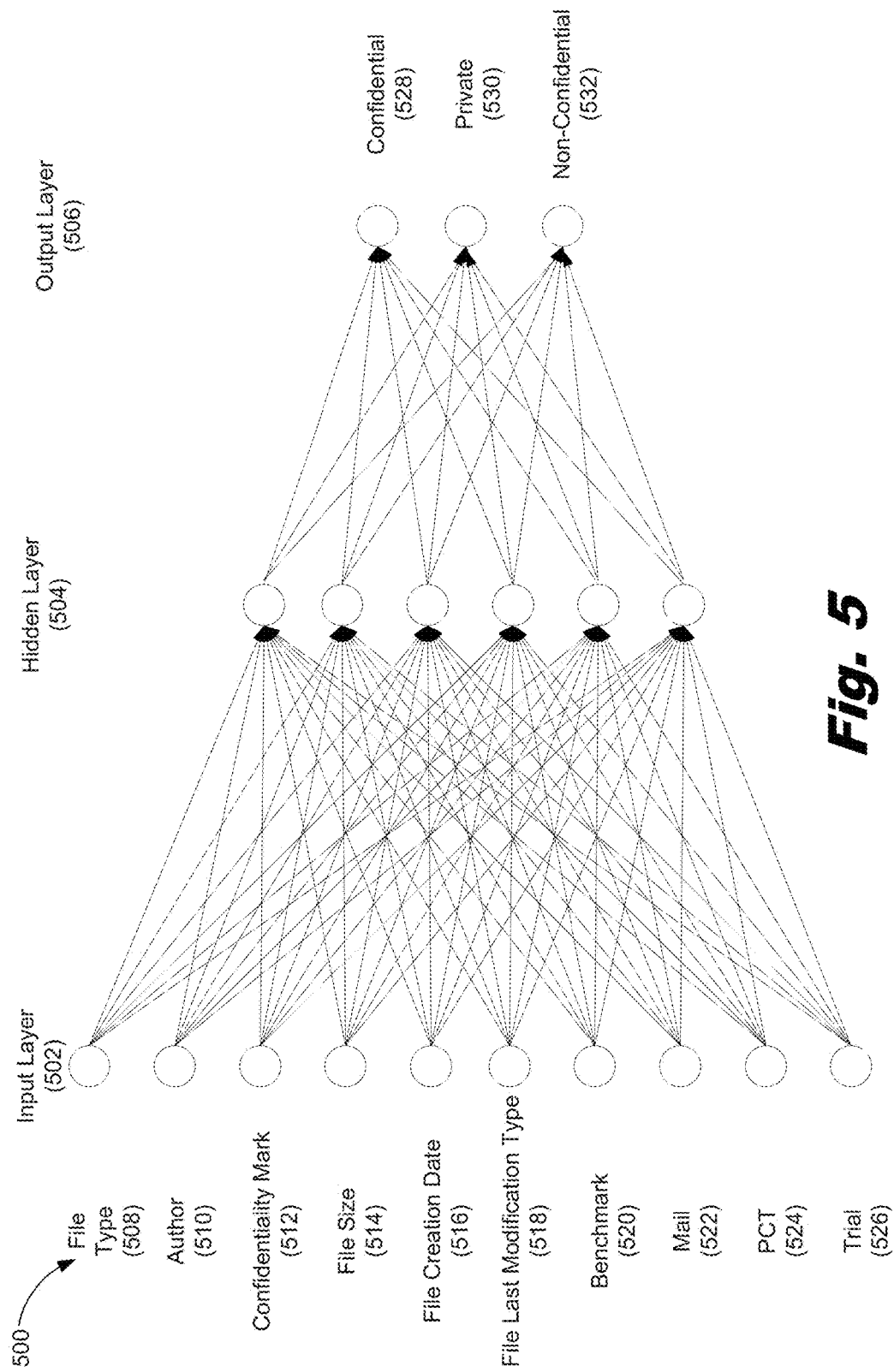
FIG. 5 is a diagram illustrating a neural net for backpropagation supervised learning with a number of output nodes, according to one example of principles described herein.
Figure 6:
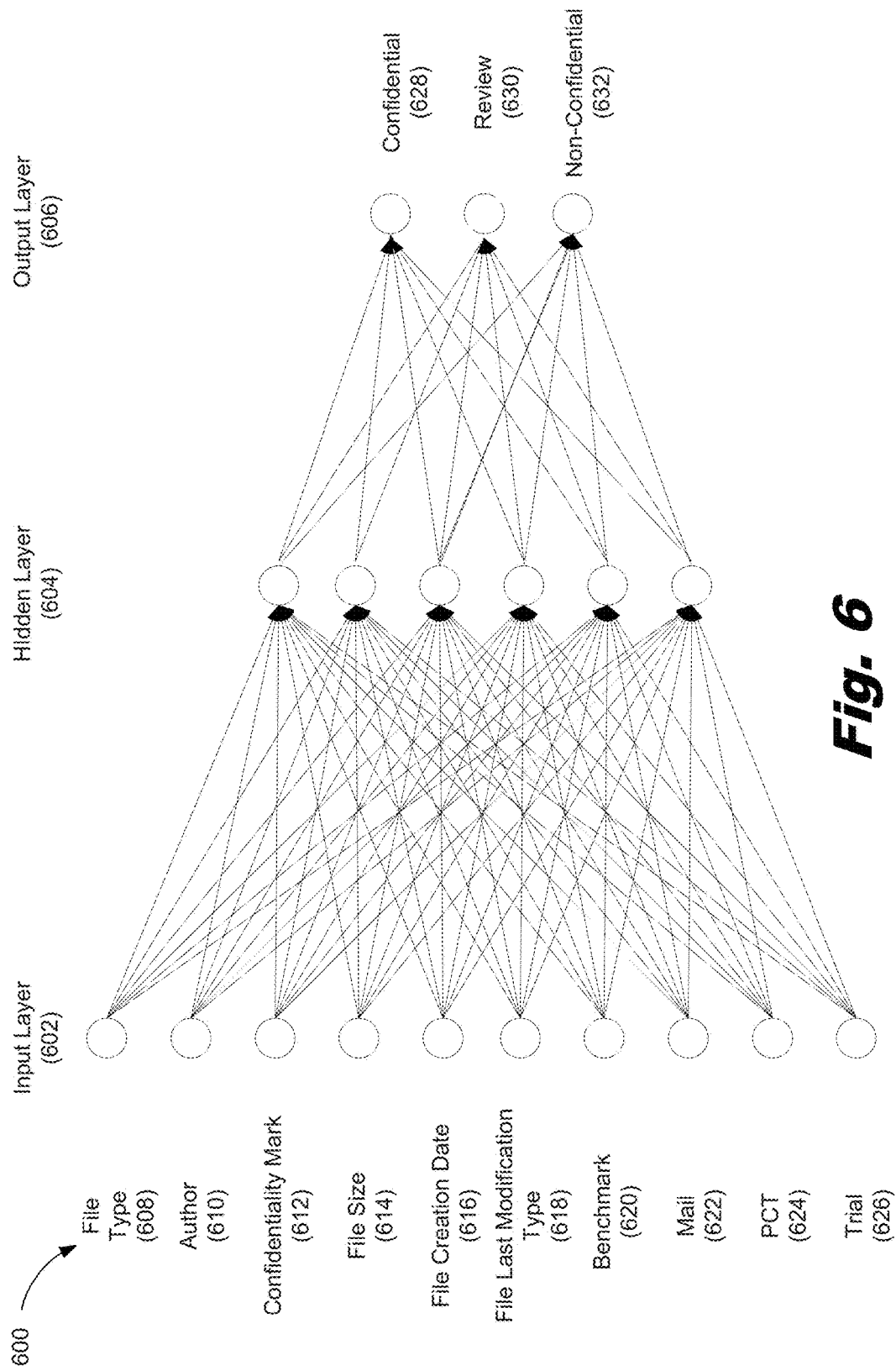
FIG. 6 is a diagram illustrating another neural net for backpropagation supervised learning with a number of output nodes, according to one example of principles described herein.
Figure 7:
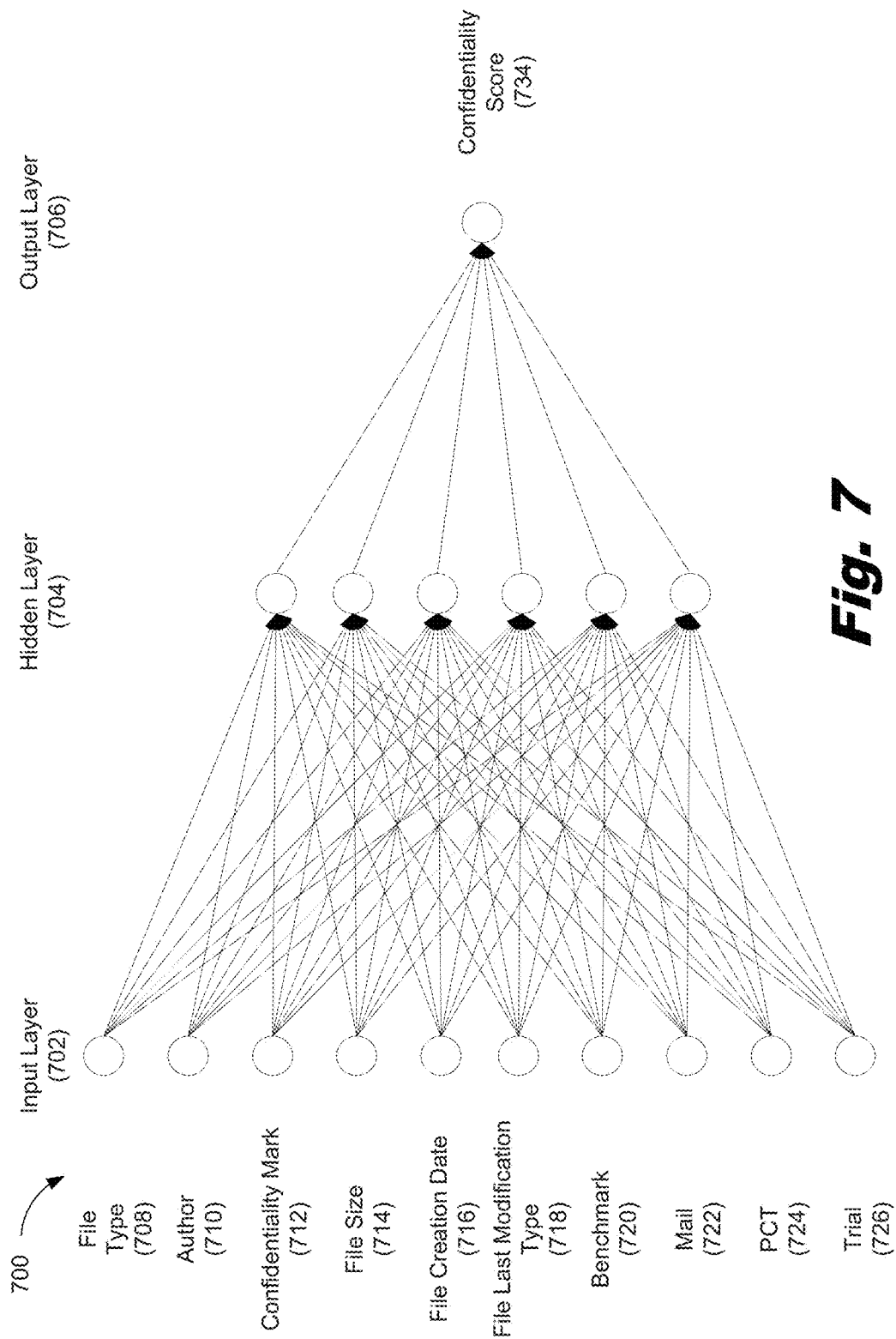
FIG. 7 is a diagram illustrating a neural net for backpropagation supervised learning with one output node, according to one example of principles described herein.

As mentioned above, after a file has been processed by a file vectorization (FIG. 1C, 114) process, the single structured representation of the file is sent to neural net. FIGS. 5, 6 and 7 represent variations of the neural net (FIG. 3, 300) described in FIG. 3. FIGS. 5, 6, and 7 describe neural nets trained for multiple output nodes to determine a file's degree of confidentiality. Further, the neural nets are retrained when new policies are enacted. For example, an organization may change its practices or polices periodically. In such a case, all existing files that were previously classified are reviewed and classified again according to the organization's new practices or policies. Training a neural net may be a laborious task. However, once a neural net is trained, the neural net can rapidly and efficiently determine the desired degree of confidentiality of each file. In FIGS. 5, 6, and 7 a file's degree of confidentiality may be, for example, "confidential," "private," "review," and "non-confidential," or have a numerical index such as a "confidentiality score." Further, a number of output layers may be used in designing a file's degree of confidentiality. Thus, the neural net is not just limited to a specific number of outputs nodes. Additionally, the neural nets in FIGS. 5, 6 and 7 are trained using the same method and techniques as described in FIG. 4.

FIG. 5 is a diagram illustrating a neural net for back-propagation supervised learning with a number of output nodes, according to one example of principles described herein. As mentioned above, a number of different machine learning techniques may be used for quickly and efficiently classifying the confidentiality of a file, and the present specification is not limited to a neural net using backpropagation and supervised learning.

As mentioned above, the input layer (502) of the neural net (500) matches the file vector (FIG. 2, 202) as described in connection with FIG. 3. Therefore, there is one input neuron (508 to 526) for each attribute in the file vector (FIG. 2, 202). In one example, these input layers (502) may include, but are not limited to, file type (508), author (510), confidentiality mark (512), file size (514), file creation date (516), file last modification type (518), benchmark (520), mail (522), PCT (524), and trial (526). The output layer (506) of the neural net (500) represents the degree of confidentiality for a file.

In FIG. 5, a neural net (500) is trained to produce a number of output nodes to indicate the degree of confidentiality for a file, such as "confidential" (528), "private" (530), and "non-confidential" (532). After a file's degree of confidentiality has been determined by the neural net (500), the file may be stored on a server (FIG. 1A, 112) according to an organization's confidentiality policy. In one example, if a file is determined to be confidential (528) or private (530), the file is stored on a secure server, such as a on a private cloud (FIG. 1A, 112-1) as described in connection with FIG. 1A. In another example, if a file is determined to be non-confidential (532), the file is stored on an unsecured server, such as a public cloud (FIG. 1A, 112-2) as described in connection with FIG. 1A.

FIG. 6 is a diagram illustrating a neural net for back-propagation supervised learning with a number of output nodes, according to one example of principles described herein. As mentioned above, the input layer (602) of the neural net (600) matches the file vector as described in connection with FIG. 2. Therefore, there is one input neuron (608 to 626) for each attribute in the file vector. In one example, these input layers (602) may include, but are not limited to, file type (608), author (610), confidentiality mark (612), file size (614), file creation date (616), file last modification type (618), benchmark (620), mail (622), PCT (624), and trial (626). The output layer (606) of the neural net (600) represents the final a degree of confidentiality for a file.

In FIG. 6, the neural net (600) is trained to produce a number of output nodes to indicate a file's degree of confidentiality, such as "confidential" (628), "review" (630), and "non-confidential" (632). In one example, if the classification of a file as to its confidentiality cannot be determined automatically, the file is flagged for review (630). A subject matter expert may then manually review the file in question and appropriately categorize the file and determine the appropriate storage strategy for such a file. After a file's degree of confidentiality has been determined by the neural net (600) or a human expert, the file may be stored on a server (FIG. 1A, 112) according to an organization's confidentiality policy. In one example, if a file is determined to be confidential (628), the file is stored on a secure server, such as a on a private cloud (FIG. 1A, 112-1) as described in connection with FIG. 1A. In another example, if a file is determined to be non-confidential (632), the file is stored on an unsecured server, such as a public cloud (FIG. 1A, 112-2) as described in connection with FIG. 1A.

In addition to file sensitivity, some organizations are also mandated to store certain types of files in country or in region to be in compliance with legislated requirements. In such a case, files may be stored on a local server (FIG. 1A, 112-3) or otherwise within the regulatory or statutorily permitted area. Alternatively, a file may be retrieved or printed as described in connection with FIG. 1B.

FIG. 7 is a diagram illustrating a neural net for back-propagation supervised learning with an output node, according to one example of principles described herein. As mentioned above, the input layer (702) of the neural net (700) matches the file vector as described in connection with FIG. 2. Therefore, there is one input neuron (708 to 726) for each attribute in the file vector. In one example, these input layers (702) may include, but are not limited to, file type (708), author (710), confidentiality mark (712), file size (714), file creation date (716), file last modification type (718), benchmark (720), mail (722), PCT (724), and trial (726). The output layer (706) represents a file's degree of confidentiality as determined by the neural net (700).

In the example of FIG. 7, a neural net (700) is trained to produce a single confidentiality score (734) such as a range between 0-100, which implies the degree of confidentiality of a file where 100 designates a file that is extremely confidential, and 0 designates a file that is entirely non-confidential. After a file's confidentiality score (734) has been determined by the neural net (700), the file may be stored on a server (FIG. 1A, 112) according to an organization's confidentiality policy. In one example, if a file is determined to have a high confidentiality score (734), the file is stored on a secure server, such as a on a private cloud (FIG. 1A, 112-1). In another example, if a file is determined to have a low confidentiality score (734), the file is stored on an unsecured server, such as a public cloud (FIG. 1A, 112-2).

In addition to file sensitivity, some organizations are also mandated to store certain types of files in country or in region to be in compliance with legislated requirements. In such a case, files may be stored on a local server (FIG. 1A, 112-3) or otherwise within the regulatory or statutorily permitted area. Alternatively, a file may be retrieved or printed as described in connection with FIG. 1B.

The preceding description has been presented to illustrate and describe examples of the principles described. This description is not intended to be exhaustive or to limit these principles to any precise form disclosed. Many modifications and variations are possible in light of the above teaching.

What is claimed is:

1. A non-transitory computer readable storage medium storing computer usable program code that, when executed by a processor, causes the processor to:
   determine whether a file contains an explicit indication of confidentiality;
   in response to a determination that the file does not contain an explicit indication of confidentiality, vectorize the file to reduce the file to a single structured representation, by:
      extracting structured attributes from the file, including file name and author of the file, using an extract transform load (ETL) method;

extracting unstructured attributes from the file, including content of the file, using a term extraction method;
combining the structured attributes and the unstructured attributes; and
with a file characteristic vector, reducing the combined structured attributes and unstructured attributes to the single structured representation;
analyze the single structured representation with a machine learning engine to generate a confidentiality classification for the file based on previous training;
classify the file based on the confidentiality classification of the file;
determine whether an organization's confidentiality policy has changed;
in response to a determination that the organization's confidentiality policy has changed, retrain the machine learning engine based on the change in the organization's confidentiality policy; and
reclassify the file based on the retrained machine learning engine.

2. The non-transitory computer readable storage medium of claim 1, further comprising computer usable program code to, when executed by the processor, implement a storage strategy for the file based on the confidentiality classification of the file, the storage strategy defining whether the file is to be stored in a secured storage or an unsecured storage.

3. The non-transitory computer readable storage medium of claim 1, wherein the machine learning engine comprises a neural net comprising:
an input layer for the structured attributes and the unstructured attributes;
an output layer for outputting the confidentiality classification of the file; and
a hidden layer for an error to propagate from the output layer to the hidden layer.

4. The non-transitory computer readable storage medium of claim 1, wherein the machine learning engine comprises a neural net.

5. The non-transitory computer readable storage medium of claim 4, wherein the computer usable program code further causes the processor to train the neural net using predetermined confidentiality files as a training set, compare the training set against a control set of files, and determine if the control set and the training set produce a valid neural net.

6. The non-transitory computer readable storage medium of claim 1, wherein the change in the organization's confidentiality policy is at least based on an introduction of a product to a market associated with the file.

7. A method for confidentiality classification of files comprising:
filtering files with a preliminary filter to determine whether each file contains an explicit indication of confidentiality;
for files that do not contain an explicit indication of confidentiality, vectorizing, by a processor of a computing device, those files to reduce each file to a single structured representation, including, for each file:
extracting structured attributes from the file, including file name and author of the file, using an extract transform load (ETL) method;
extracting unstructured attributes from the file, including content of the file, using a term extraction method;
with a file attribute aggregator, combining the structured attributes and the unstructured attributes; and
with a file characteristic vector, reducing the combined structured attributes and unstructured attributes to the single structured representation,
analyzing, by the processor, the single structured representation of each file to generate a confidentiality classification of each file;
classifying, by the processor, each of the files in a secure storage or an unsecured storage based on the confidentiality classification of the file;
determining whether an organization's confidentiality policy has changed, wherein the change in the organization's confidentiality policy is at least based on an introduction of a product to a market associated with the files; and
in response to a determination that the organization's confidentiality policy has changed, reclassifying the files based on the change in the organization's confidentiality policy.

8. The method of claim 7, wherein the preliminary filter is driven by classification heuristics determined by subject matter experts.

9. The method of claim 7, further comprising implementing a storage strategy for the files based on the confidentiality classification of the files, the storage strategy defining whether the files are to be stored in the secured storage or the unsecured storage.

10. The method of claim 9, further comprising managing a jurisdiction in which the files are stored as part of the storage strategy so as to comply with an applicable legal requirement.

11. The method of claim 7, wherein the system comprises a neural net, the method further comprising:
retraining the neural net to determine the degree of confidentiality for the files; and
generating a second confidentiality classification for the files based on the retrained neural net.

12. The method of claim 7, wherein the reclassifying of the files based on the retrained machine learning engine comprises reclassifying the files associated with the product as not confidential.

13. The method of claim 7, further comprising:
retraining the machine learning engine in response to the change in the organization's confidentiality policy, and
reclassifying the files based on the retrained machine learning engine and the confidentiality classification of the file.

14. A system for confidentiality classification of files, the system comprising:
a processor; and
a memory storing instructions that when executed cause the processor to:
for a file that does not contain an explicit indication of confidentiality, vectorize the file to reduce the file to a single structured representation, by:
extracting structured attributes from the file using an extract transform load (ETL) method;
extracting unstructured attributes from the file using a term extraction method;
combining the structured attributes and the unstructured attributes; and
with a file characteristic vector, reducing the combined structured attributes and unstructured attributes to the single structured representation;

analyze the single structured representation of the file to generate a confidentiality classification for the file based on previous training;

classify the file based on the confidentiality classification of the file;

determine whether an organization's confidentiality policy has changed, wherein the change in the organization's confidentiality policy is at least based on an introduction of a product to a market associated with the file; and in response to a determination that the organization's confidentiality policy has changed, reclassify the file based on the change in the organization's confidentiality policy.

15. The system of claim 14, further comprising a preliminary filter to determine whether each file contains an explicit indication of confidentiality classification.

16. The system of claim 14, wherein the system comprises a neural net comprising:

an input layer for the structured attributes and the unstructured attributes;

an output layer for outputting the confidentiality classification of the file; and a hidden layer for an error to propagate from the output layer to the hidden layer.

17. The system of claim 14, wherein, in response to a determination that the organization's confidentiality policy has changed, the instructions are to cause the processor to:

retrain a machine learning engine based on the change in the organization's confidentiality policy; and reclassify the file based on the retrained machine learning engine and the confidentiality classification of the file.

\* \* \* \* \*